United States Patent
Hare

(10) Patent No.: US 9,855,969 B2
(45) Date of Patent: Jan. 2, 2018

(54) SHOCK MOUNT ASSEMBLY

(71) Applicant: Addictive Desert Designs, LLC, Mesa, AZ (US)

(72) Inventor: Jared A. Hare, Mesa, AZ (US)

(73) Assignee: Addictive Desert Designs, LLC, Mesa, AZ (US)

( * ) Notice: Subject to any disclaimer, the term of this patent is extended or adjusted under 35 U.S.C. 154(b) by 0 days.

(21) Appl. No.: 14/874,628

(22) Filed: Oct. 5, 2015

(65) Prior Publication Data
US 2017/0036697 A1    Feb. 9, 2017

Related U.S. Application Data

(63) Continuation-in-part of application No. 29/535,424, filed on Aug. 6, 2015, now Pat. No. Des. 780,643.

(51) Int. Cl.
*B62D 21/11* (2006.01)
*B62D 21/02* (2006.01)

(52) U.S. Cl.
CPC ............. *B62D 21/11* (2013.01); *B62D 21/02* (2013.01); *B60G 2204/128* (2013.01)

(58) Field of Classification Search
CPC ........ B62D 21/02; B62D 21/08; B62D 21/11; B62D 25/088; B60G 2204/128
See application file for complete search history.

(56) References Cited

U.S. PATENT DOCUMENTS

| | | | | |
|---|---|---|---|---|
| 4,906,018 A * | 3/1990 | Kijima | ..................... | B60G 3/22 280/124.109 |
| 5,335,932 A * | 8/1994 | Pierce | ..................... | B60G 11/27 280/124.116 |
| 5,720,489 A * | 2/1998 | Pierce | .................. | B62D 53/068 280/149.2 |
| 6,511,096 B1 * | 1/2003 | Kunert | ..................... | B60G 7/02 280/124.109 |
| 6,547,281 B1 * | 4/2003 | Iwatsuki | ................ | B60G 11/16 280/781 |
| 6,702,325 B1 * | 3/2004 | Pierce | ...................... | B60G 9/00 180/352 |
| 7,658,412 B2 * | 2/2010 | Ramsey | .................... | B60G 7/02 280/784 |
| 7,997,618 B2 * | 8/2011 | Hartmann | .............. | B62D 25/08 180/311 |
| 8,006,990 B1 * | 8/2011 | Davis | ..................... | B60G 11/10 267/260 |
| 8,695,998 B1 * | 4/2014 | Karel | ..................... | B62D 61/12 280/86.5 |
| 8,764,036 B2 * | 7/2014 | Muckelrath | .......... | B60G 13/005 180/227 |
| 8,801,013 B2 * | 8/2014 | Ramsey | ................ | B60G 99/00 280/124.11 |
| 8,899,664 B2 * | 12/2014 | Lee | ........................ | B62D 21/11 296/193.01 |

(Continued)

*Primary Examiner* — Paul N Dickson
*Assistant Examiner* — Timothy Wilhelm
(74) *Attorney, Agent, or Firm* — Venjuris P.C.; Michael F. Campillo

(57) ABSTRACT

A shock mount assembly for attachment to a vehicle frame and a vehicle rear axle, including a mounting beam attachable to the vehicle frame and having shock mounts that are attachable to shock first ends. Shock mount gusset plates provide an attachment point for shocks that extend to the vehicle rear axle.

17 Claims, 8 Drawing Sheets

(56) References Cited

U.S. PATENT DOCUMENTS

| | | | |
|---|---|---|---|
| 8,960,694 B2* | 2/2015 | Aalderink | B60G 7/02 |
| | | | 280/124.109 |
| 8,998,305 B2* | 4/2015 | Obata | B62D 21/11 |
| | | | 296/193.08 |
| 9,352,785 B2* | 5/2016 | Winberg | B62D 21/155 |
| 2002/0113399 A1* | 8/2002 | Fehler | B60G 3/18 |
| | | | 280/124.165 |
| 2004/0021290 A1* | 2/2004 | Hicks | B60G 9/00 |
| | | | 280/438.1 |
| 2004/0108677 A1* | 6/2004 | Sekiguchi | B60G 7/02 |
| | | | 280/124.109 |
| 2006/0138764 A1* | 6/2006 | Hagemann | B62D 21/02 |
| | | | 280/781 |
| 2011/0309594 A1* | 12/2011 | Zohar | B60G 7/001 |
| | | | 280/124.109 |

* cited by examiner

SHOCK MOUNT ASSEMBLY

FIELD OF THE INVENTION

The present invention relates to mountings for shocks for vehicles and in particular, mountings for shocks that are relocated on a truck.

Shocks or struts are essential components of a vehicle suspension that dampen impact forces and vibration occurring during driving and ensure that tires remain safely in contact with the ground. Moreover, shocks are a component that can be upgraded to accommodate extreme driving experiences such as off-road racing or recreation. Extreme driving experiences however also result in additional forces that can be partly handled by shocks but are also transferred to the vehicle frame. The additional transferred force can result in wear and tear, and in some cases catastrophic failure, of the vehicle suspension or vehicle frame, or both.

Accordingly, there is a need for improvements to vehicle suspension systems, and in particular, improvements that augment or improve existing vehicle suspension systems by augmenting or improve the strength of vehicle frames.

SUMMARY OF THE INVENTION

The shock mount assembly comprises a device, kit, apparatus, and methods for improving vehicles by supplementing a vehicle suspension system while strengthening the vehicle frame. The shock mount assembly described herein improves the existing shock mount positioning with stronger shock mounting hardware that also supports, reinforces, or buttresses the existing components of the vehicle frame, by attachment to a vehicles first longitudinal frame beam, second longitudinal frame beam, and cross or transverse frame beam, that is attached substantially perpendicularly between the first longitudinal frame beam and the second longitudinal frame beam.

Embodiments of the shock mount assembly include a mounting beam having a mounting beam first end and a mounting beam second end. The mounting beam includes a first frame contact plate that is attachable to the at least one transverse frame beam and a second frame contact plate that is also attachable to the at least one transverse frame beam. A first elbow is fixed or attached to the mounting beam first end and attachable to the first longitudinal frame beam and a second elbow is fixed or attached to the mounting beam second end and attachable to the second longitudinal frame beam. A first shock mount is attached to the first elbow and a second shock mount attached to the second elbow and each shock mount has a first gusset plate and a second gusset plate that extend at an angle downward and slightly outward from the respective shock mount. Each gusset plate includes a shock mount aperture to which a first end of the shock is attachable. A first shock is attachable between first shock mount and a first axle mount and a second shock is attachable between the second shock mount and a second axle mount.

Further embodiments include variations wherein the first elbow and the second elbow each have an elbow first portion attached substantially perpendicularly to an elbow second portion, the elbow first portions attached to the mounting beam first end and the mounting beam second end, respectively, and attachable to the first longitudinal frame beam and the second longitudinal frame beam, respectively, and the elbow second portions are attachable to the first longitudinal frame beam and the second longitudinal frame beam. Further, the elbow first portions are attached to the mounting beam first end and mounting beam second end at angles substantially equal to the angle between the first longitudinal frame beam and the transverse frame beam and the angle between the second longitudinal frame beam and the transverse frame beam, respectively. Wedge shaped gussets may be included between the shock mount first plates and the elbow first portions of each shock mount to provide additional strength to the respective structures or joint.

The first shock mount and the second shock mount may each comprise a shock mount first plate and the first gusset plate and the second gusset plate may each extend at an angle downward and outward from the shock mount first plate. Further, the first shock mount and the second shock mount may each further comprise a shock mount second plate attached at substantially right angles to the shock mount first plate and the first gusset plate and the second gusset plate each extend rearward and downward from the shock mount first plate and towards the vehicle rear axle. The second gusset plate of each shock mount may comprise the furthest outward facing surface of each shock mount and the second gusset plate may have a perimeter. The first shock and the second shock may extend substantially parallel to the second gusset plates and the shock first ends may extend to the shock mount apertures that are located within the perimeter of the second gusset plate. The structure may be reinforced by a first gusset plate reinforcement wall extending between the first gusset plate and the second gusset plate and the first gusset plate reinforcement wall may comprises two rectangular wall portions, attached together at an angle and attached substantially perpendicularly to and between the first gusset plate and the second gusset plate. A second gusset plate reinforcement wall may extend between the first gusset plate and the elbow first portion and the second gusset plate reinforcement wall may comprise a rectangular wall portion and a trapezoidal wall portion, attached together at an angle and attached substantially perpendicularly to and between the first gusset plate and the elbow first portion.

DESCRIPTION OF PREFERRED EMBODIMENTS

Figure 1:
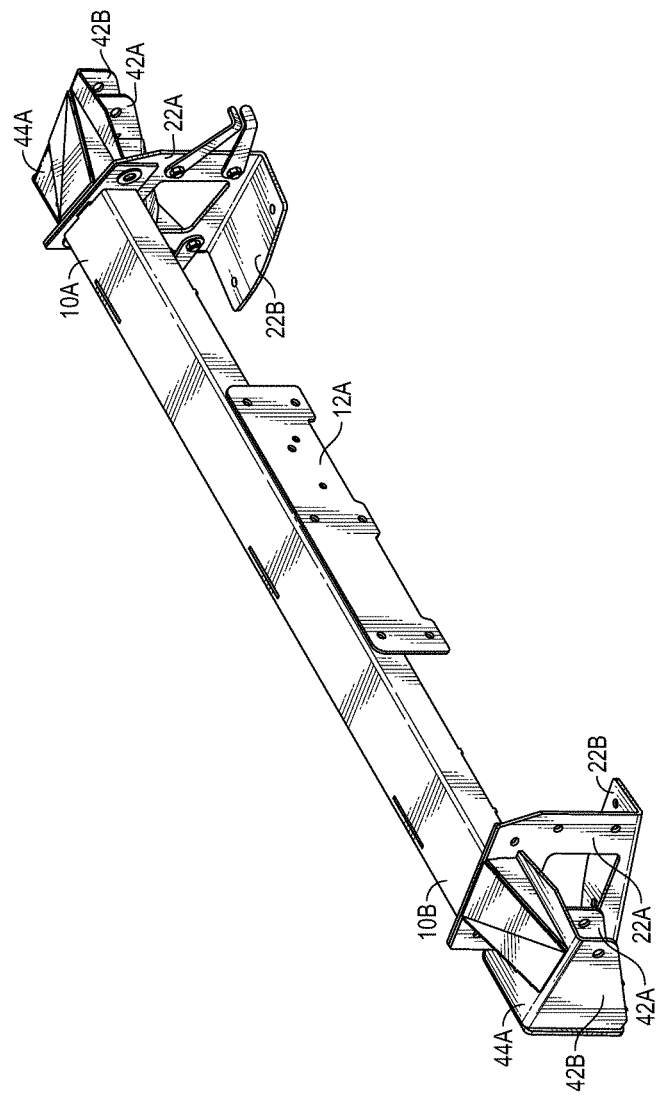
FIG. 1 illustrates a perspective view of a shock mount assembly according to the description, the first frame contact plate 12A is attachable to a vehicle frame transverse beam 2C (not shown) and vehicle shocks are attachable to the first shock mount at the mounting beam first end 10A and the second shock mount at the mounting beam second end 10B, respectively.
Figure 2:
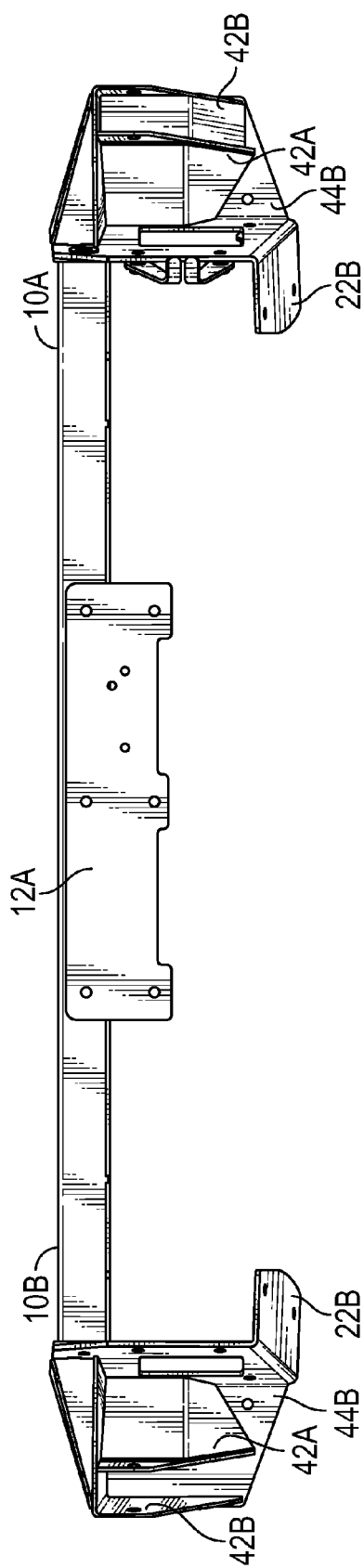
FIGS. 2 and 3 illustrate front and rear views of the shock mount assembly, respectively.
Figure 3:
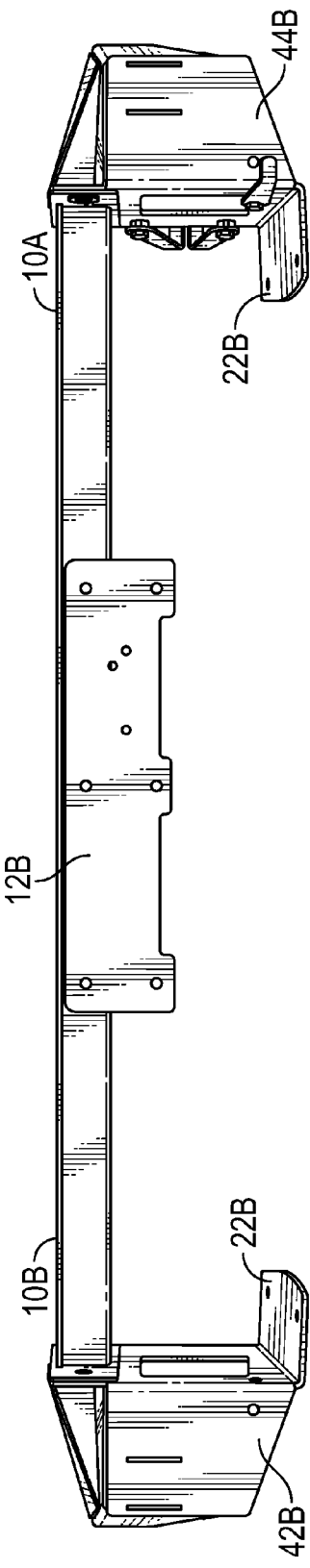
Figure 4:
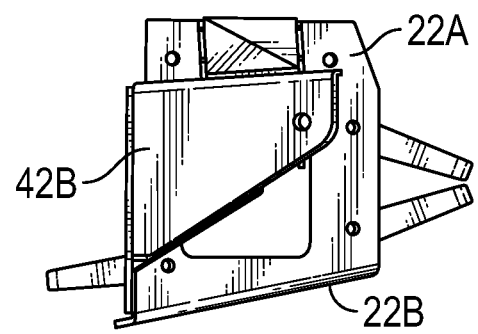
FIGS. 4 and 5 illustrate side views of the first shock mount and second shock mount, respectively, wherein the elbow second portions 22B are attachable flush against and along a first longitudinal frame beam 2A and second longitudinal frame beam 2B of the vehicle frame (not shown)
Figure 5:
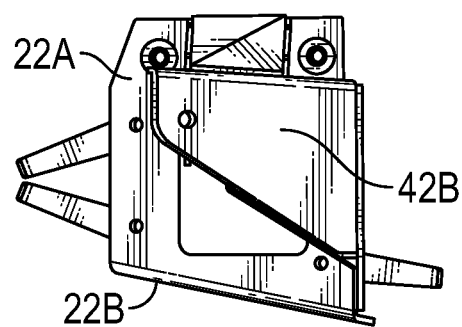
Figure 6:
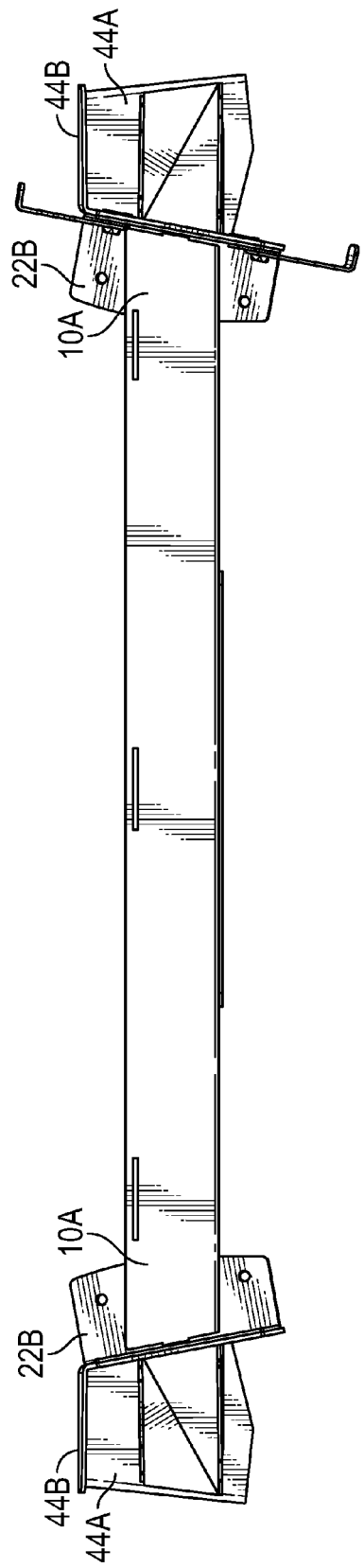
FIGS. 6 and 7 illustrate top and bottom views of the shock mount assembly, respectively.
Figure 7:
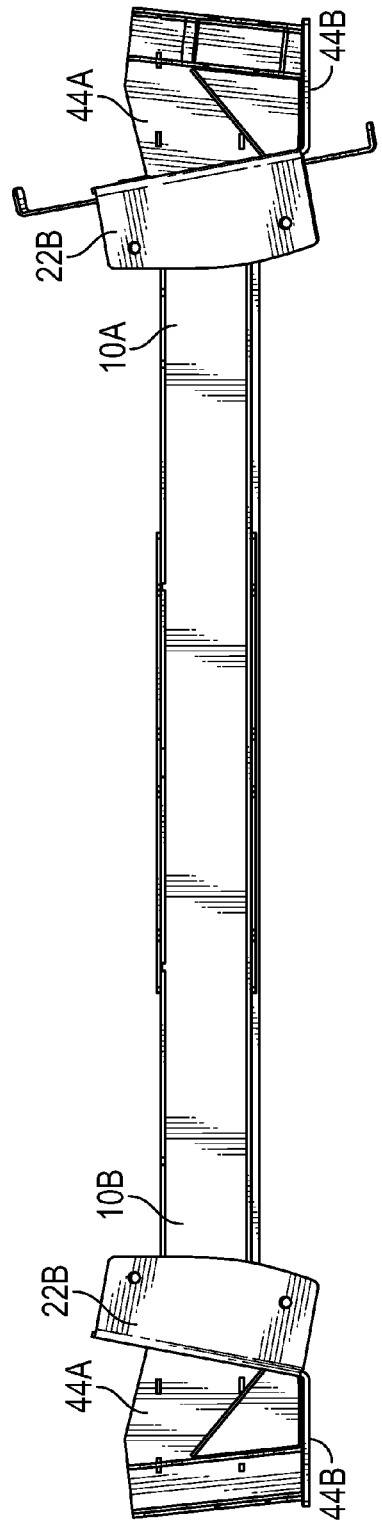
Figure 8:
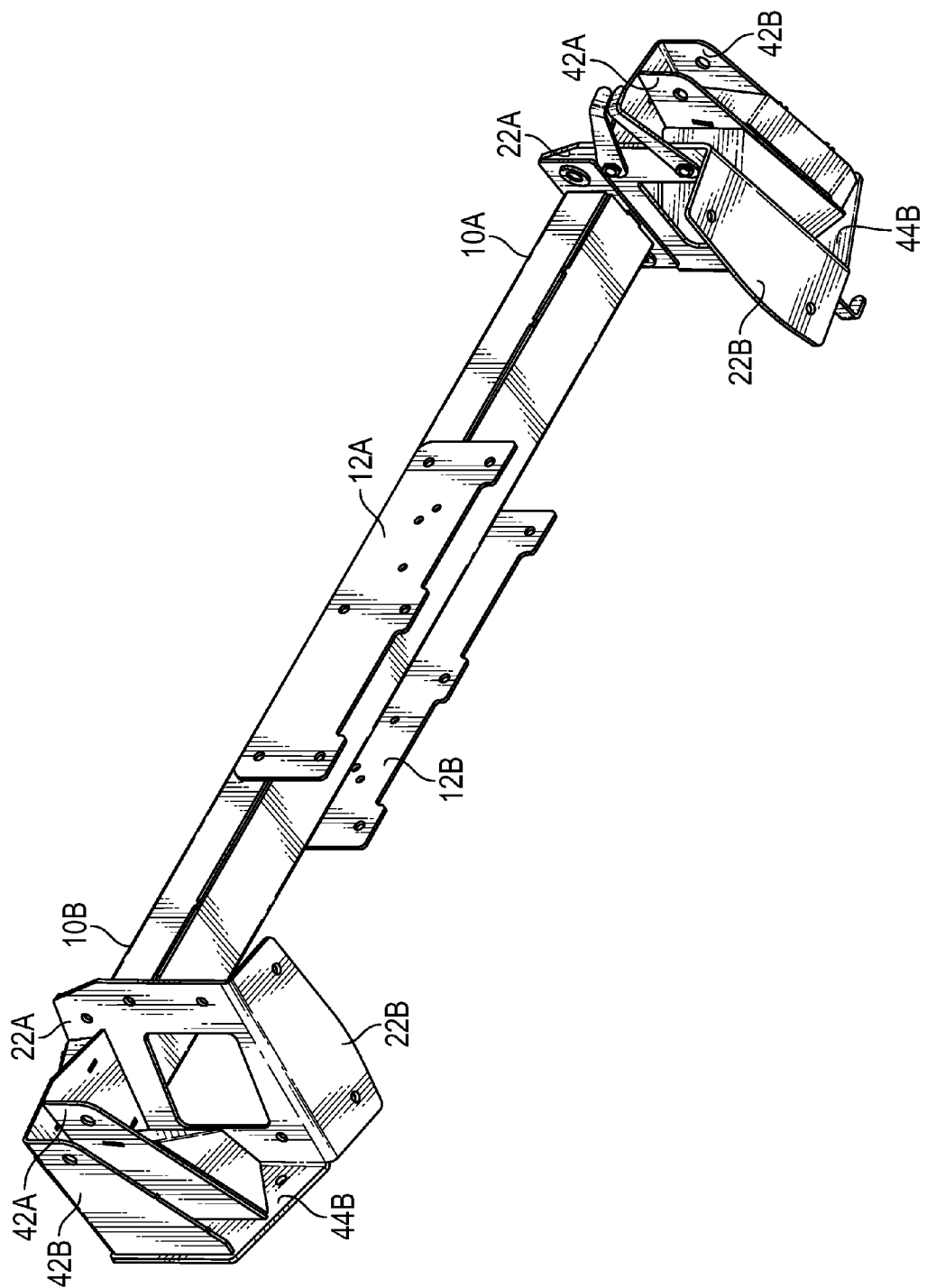
FIG. 8 illustrates perspective view of the shock assembly from beneath.
Figure 9:
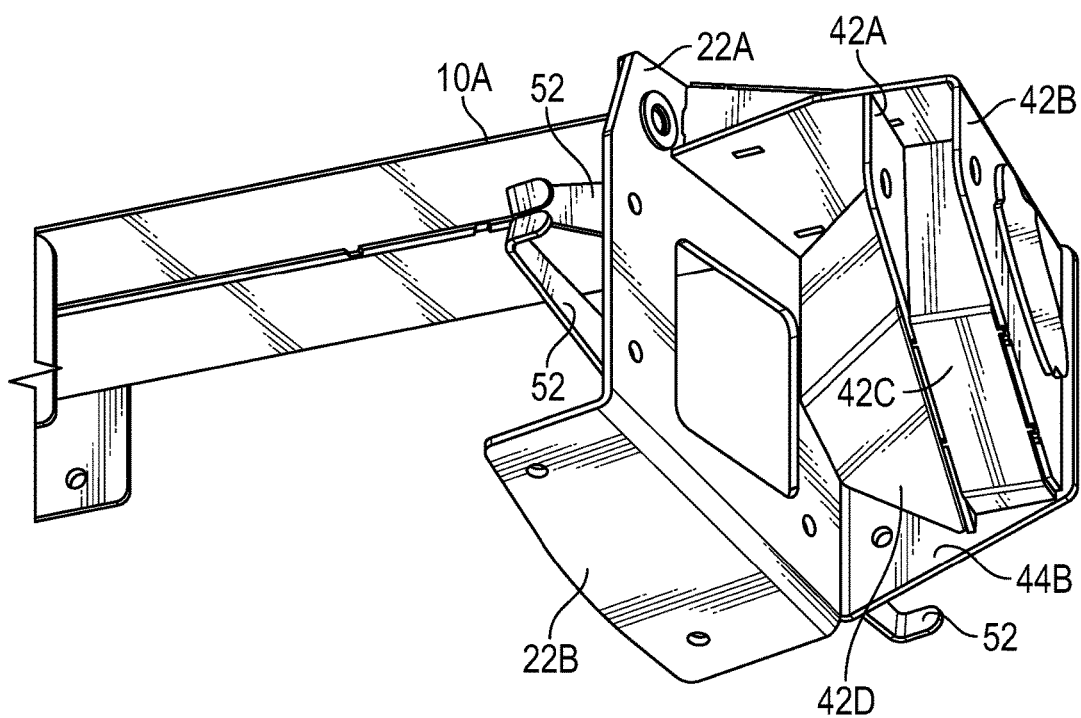
FIG. 9 illustrates a close-up or detailed view of the components of the shock mount first end.
Figure 10:
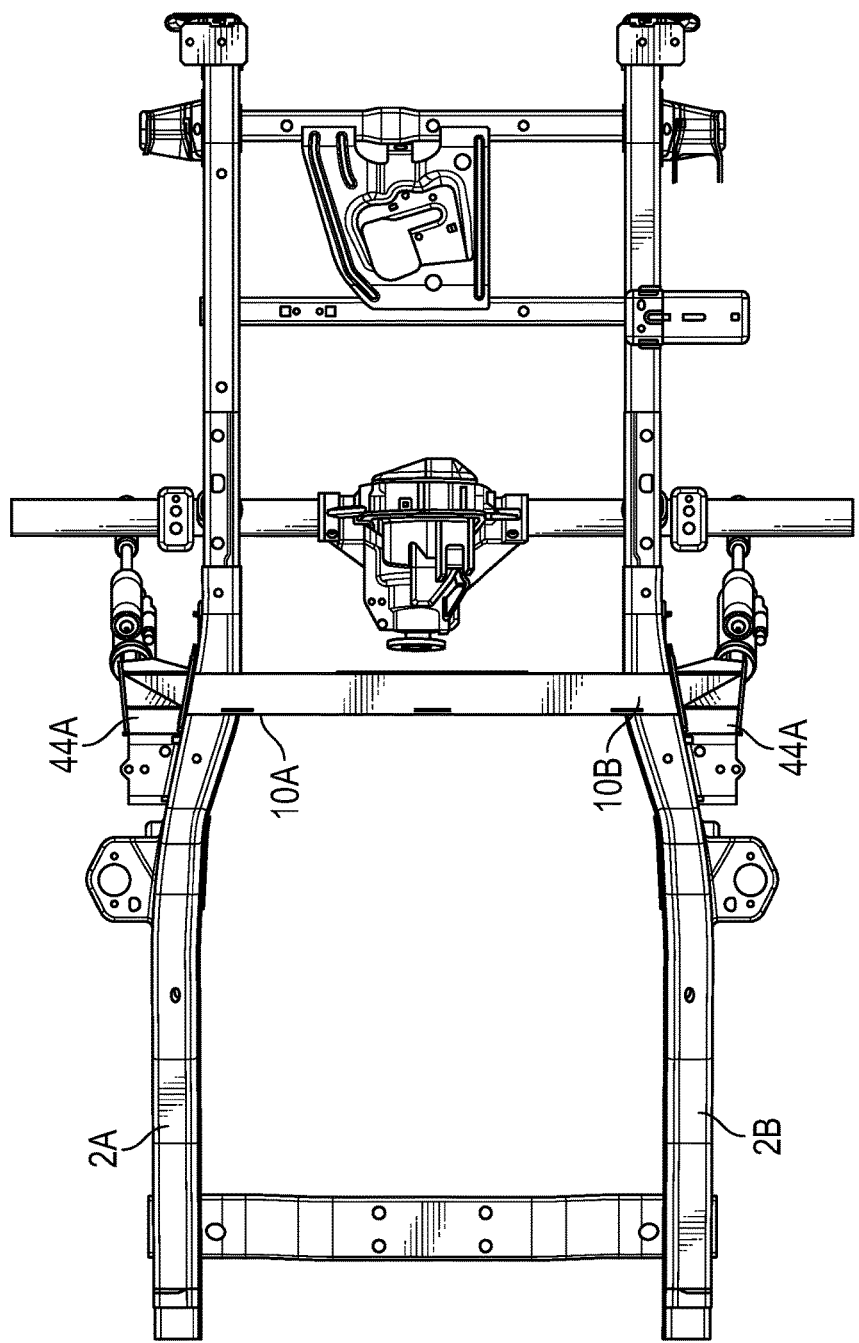
FIG. 10 illustrates a top view of the shock mount assembly mounted on a vehicle frame, and in particular the shock mount first plate 44A and shock mount second plate 44B mounted or attached flush against and along at least one side each of the first longitudinal frame beam 2A and the second longitudinal frame beam 2B of the vehicle frame.
Figure 11:
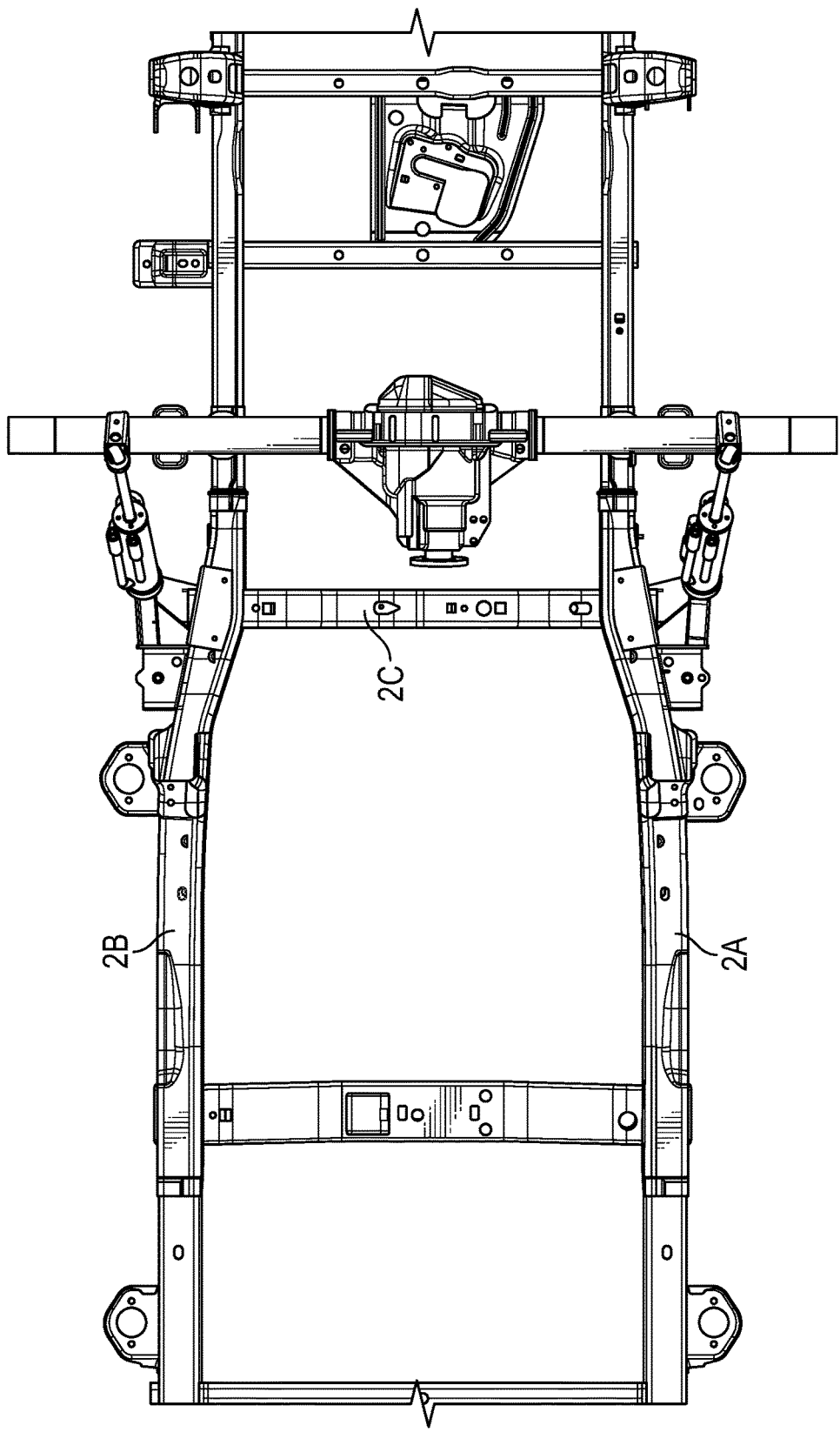
FIG. 11 illustrates a bottom view of the shock mount assembly mounted on a vehicle frame, and also shows the shock mount first plate 44A and shock mount second plate 44B mounted or attached flush against and along at least one side each of the first longitudinal frame beam 2A and the second longitudinal frame beam 2B of the vehicle frame, and the mounting beam (10A and 10B) attached to the vehicle transverse frame beam 2C.

FIG. 1 illustrates a preferred embodiment of a shock mount assembly adapted for a vehicle frame and a vehicle rear axle. A vehicle frame useful with the described invention is comprised of at least a first longitudinal frame beam 2A and a second longitudinal frame beam 2B that each extend along the length of the vehicle i.e. from front to back or vice-versa. Moreover, the at least one transverse frame beam 2C is attached substantially perpendicularly between the first longitudinal frame beam 2A and the second longitudinal frame beam 2B and provides transverse structural support to the vehicle frame. It is noted that the illustrations are of a vehicle frame with the first longitudinal frame beam 2A and a second longitudinal frame beam 2B intersecting with the at least one transverse frame beam 2C at an angle, however the shock mount assembly may be adapted to variations of vehicle frame designs and remain within the concept of the invention.

As illustrated, the preferred shock mount assembly embodiment includes a mounting beam that is attachable substantially parallel to or along the at least one vehicle frame transverse frame beam 2C. A preferred mounting beam comprises a constructed, multi-sided beam having a rectangular or square cross-section. The mounting beam is attachable to the vehicle frame by various structures or fasteners; however a preferred attachment structure comprises a first frame contact plate 12A on a first side of the mounting beam and a second frame contact plate 12B on an alternate, opposite, or second side of the mounting beam. Further, the mounting beam preferably has a width that matches the width of the transverse frame beam 2C and the first frame contact plate 12A and second frame contact plate 12B project beyond or beneath the mounting beam so that the first frame contact plate 12A and second frame contact plate 12B each are flush against and attachable to and along opposite sides or surfaces of the middle portion of the transverse frame beam 2C.

As illustrated, the first frame contact plate 12A is flush against a first side surface of the of the transverse frame beam 2C and a surface of the second frame contact plate 12B is flush against a second or opposite side surface of the of the transverse frame beam 2C and the mounting beam straddles the transverse frame beam 2C along its length. The first frame contact plate 12A and second frame contact plate 12B have holes pre-drilled to allow fasteners such as bolts or screws or equivalents thereof to attach the mounting beam to the transverse frame beam 2C, which has matching holes drilled therein to receive the fasteners to secure the mounting beam to the transverse frame beam 2C.

The mounting beam is further comprised of a mounting beam first end 10A and a mounting beam second end 10B that each transition to, or are attached to, a first elbow and a second elbow, respectively, and that further couple the mounting beam first end 10A and mounting beam second end 10B to the transverse frame beam 2C, the first longitudinal frame beam 2A, and the second longitudinal frame beam 2B. More particularly, the first elbow is fixed or attached to the mounting beam first end 10A and is attachable to and at the joint comprised of the first longitudinal frame beam 2A and a first end of the transverse frame beam 2C. Likewise, the second elbow is fixed or attached to the mounting beam second end 10B and is attachable to and at the joint comprised of the second longitudinal frame beam 2B and a second end of the transverse frame beam 2C.

Preferred embodiments of the first elbow and second elbow each comprise an elbow first portion 22A and an elbow second portion 22B. The elbow first portion 22A is attached or extends substantially perpendicularly to the elbow second portion 22B and the elbow first portions 22A are attached or fixed to the mounting beam first end 10A and the mounting beam second end 10B, respectively. Moreover, it is preferred that the elbow first portions 22A meet and attach to the mounting beam ends, 10A and 10B, respectively, at the same angles that the first longitudinal frame beam 2A and the second longitudinal frame beam 2B meet the transverse frame beam 2C so that the shock mount assembly elements described nestle or mount flush against the joints comprised of the longitudinal frame beams, 2A and 2B, and the transverse frame beam 2C as illustrated.

The elbow first portions 22A are attachable to a first side of the longitudinal frame beam 2A and the second longitudinal frame beam 2C on each side of the vehicle frame, respectively. The elbow second portions 22B are each respectively attachable to a second surface or side of the first longitudinal frame beam 2A and of the second longitudinal frame beam 2B. The preferred elbow first portions 22A are attachable to a vertically oriented surface (e.g. right or left side surface) of the first longitudinal frame beam 2A and preferred elbow second portions 22B are each attachable to a lateral or horizontally oriented surface (e.g. top or bottom surface) of the first longitudinal frame beam 2A. Again, holes drilled in the respective vehicle frame surfaces and elbow portions allow fasteners such as bolts or screws to attach the elbows to the appropriate vehicle frame components, which have matching holes drilled therein to receive the fasteners to secure the mounting beam to the first longitudinal frame beam 2A, second longitudinal frame beam 2B, and transverse frame beam 2C.

A first shock mount is fixed or attached to the first elbow and a second shock mount is fixed to or attached to the second elbow, with each shock mount including a first gusset plate 42A and a second gusset plate 42B that extend substantially parallel to each other from the respective shock mount first plate 44A and have shock mount apertures therein to permit each rear shock to be mounted and pointed toward the vehicle rear axle. More particularly, a first shock and a second shock each have a shock first end that are each attachable to the first shock mount and second shock mount, respectively, at the respective shock mount apertures. Preferred first gusset plates 42A and second gusset plates 42B extend diagonally downward and outward from the respective shock mount first plate 44A and also project the first shock and second shock in the same diagonal angle of the first gusset plates 42A and second gusset plates 42B.

The first shock mount and the second shock mount each comprise a shock mount first plate 44A and the first gusset plate 42A and the second gusset plate 42B each extend at an angle downward from the shock mount first plate 44A. Further, wedge shaped gussets are attached between the shock mount first plates 44A and the elbow first portions 22A of each shock mount. More particularly, the wedge shaped gussets comprise two triangular shaped portions that have a smaller triangular segment positioned against the elbow first portions 22A and a longer triangular segment against the shock mount first plates 44A. A rectangular shaped plate is connected across or between the hypotenuses of two triangular shaped portions.

The first shock mount and the second shock mount each further comprise a shock mount second plate 44B attached at substantially right angles to the shock mount first plate 44A. The first gusset plate 42A and the second gusset plate 42B each extend rearward and downward from the shock mount second plate 44B toward the vehicle rear axle so that the second gusset plate 42B of each shock mount comprises the furthest outward facing surface of each shock mount and strengthens the joint or union of the shock mount first plate 44A and shock mount second plate 44B and protects the shock first end during use of the vehicle. As illustrated, each second gusset plate 42B has a gusset plate perimeter and the first shock and the second shock extend substantially parallel to the second gusset plates 42B and the shock first ends extend to the shock mount apertures that are located within the gusset plate perimeter.

In preferred embodiments, at least a first gusset plate reinforcement wall 46 extends between the first gusset plate 42A and the second gusset plate 42B and may comprise two rectangular wall portions, attached together at an angle and attached substantially perpendicularly to and between the first gusset plate 42A and the second gusset plate 42B. Further, a second gusset plate reinforcement wall 48 extending between the first gusset plate 42A and the elbow first portion 22A may comprise a rectangular wall portion and a trapezoidal wall portion, attached together at an angle and attached substantially perpendicularly to and between the second gusset plate 42B and the elbow first portion 22A. Additionally, the second gusset plate reinforcement wall 48 may include a window or aperture adjacent the first gusset plate 42A.

The first shock and the second shock each further include a shock second end that are each attachable to a first axle mount 30A and a second axle mount 30B, which may be included with the shock mount assembly or alternately existing or original components of the vehicle. The first axle mount 30A and second axle mount 30B may each comprise a first axle bracket 32A and a second axle bracket 32B that are each attachable to the vehicle rear axle, respectively, and the shock second ends are attachable to the first axle bracket 32A and the second axle bracket 32B, respectively, when the shock mount assembly is installed on a vehicle. The first axle bracket 32A and the second axle bracket 32B each comprise an axle bracket first portion 34A that is attachable to the vehicle axle from above the vehicle axle and an axle bracket second portion 34B that is attachable to the vehicle axle from below the vehicle axle. The shock mount assembly may be used with axle mounts, 30A and 30B, which as illustrated comprise an axle bracket first portion 34A that is offset horizontally from the respective axle bracket second portion 34B. Shock second ends are attachable to the axle bracket second portions 34B, respectively, which extend beneath the vehicle axle and permit sufficient space for shock-travel during use.

The shock mount assembly is preferably constructed of metal or metal alloy portions welded together in the positions and orientations described herein. Installation of the shock mount assembly comprises alignment and placement of the mounting beam and first frame contact plate 12A and second frame contact plate 12B over the transverse frame beam 2C such that the first frame contact plate 12A and second frame contact plate 12B sit flush against at least two, and preferably opposite sides of the at least one transverse frame beam 2C; and the first elbow and second elbow sit flush against the first longitudinal frame beam 2A and the second longitudinal frame beam 2B, respectively. If necessary, holes are drilled in the transverse frame beam 2C to accept fasteners that attach the first frame contact plate 12A and second frame contact plate 12B to the transverse frame beam 2C, and the first elbow and second elbow to the first longitudinal frame beam 2A and the second longitudinal frame beam 2B, respectively.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A shock mount assembly comprising:
a mounting beam having a mounting beam first end and a mounting beam second end;
a first frame contact plate and a second frame contact plate that each project beyond the mounting beam and that are attached to a first and second surface of the mounting beam, respectively;
a first elbow attached to the mounting beam first end;
a second elbow attached to the mounting beam second end; and
a first shock mount and a second shock mount, each shock mount comprising a shock mount first plate extending substantially horizontally from the first elbow and substantially opposite from the mounting beam, and a first gusset plate and second gusset plate, each extending from the shock mount first plate and having a shock mount apertures;
wherein the shock mount assembly is attachable to a vehicle frame, the vehicle frame comprised of a transverse frame beam coupled between a first longitudinal frame beam and a second longitudinal frame beam, and the first elbow and the second elbow are attachable to the first longitudinal frame beam and the second longitudinal frame beam, respectively, and the shock mount first plates extend outside of the first and second longitudinal frame beams; and a first shock and a second shock are attachable to the first shock mount and second shock mount, respectively, the mounting beam has a width that substantially matches the width of the transverse frame beam and the first and second frame contact plates are attachable along and to a first and second surface of the transverse frame beam, respectively.

2. The shock mount assembly in claim 1 further comprising,
an elbow first portion attached substantially perpendicularly to an elbow second portion, the elbow first portions attached to the mounting beam first end and the mounting beam second end, respectively, and wherein when install on a vehicle, the elbow first portions and elbow second portions are attachable to the first longitudinal frame beam and the second longitudinal frame beam, respectively.

3. The shock mount assembly in claim 2 wherein,
the elbow first portions are attached to the mounting beam first end and mounting beam second end at angles substantially equal to the angle between the first longitudinal frame beam and the transverse frame beam and the angle between the second longitudinal frame beam and the transverse frame beam, respectively.

4. The shock mount assembly in claim 2 wherein,
wedge shaped gussets are attached between the shock mount first plates and the elbow first portions of each shock mount.

5. The shock mount assembly in claim 1 wherein,
the first shock mount and the second shock mount each further comprise a shock mount second plate attached at substantially right angles to the shock mount first plate and the first gusset plate and the second gusset plate each extend rearward from the shock mount second plate and downward from the shock mount first plate and towards the vehicle rear axle.

6. The shock mount assembly in claim 2 wherein,
the first shock mount and the second shock mount each comprise a shock mount first plate and the first gusset plate and the second gusset plate each extend at an angle downward from the shock mount first plate.

7. The shock mount assembly in claim 6 wherein,
the second gusset plate of each shock mount comprises the furthest outward facing surface of each shock mount.

8. The shock mount assembly in claim 7 wherein,
the second gusset plate has a gusset plate perimeter and the first shock and the second shock extend substantially parallel to the second gusset plates and the shock first ends extend to the shock mount apertures that are located within the gusset plate perimeter.

9. The shock mount assembly in claim 7 further comprising,
a first gusset plate reinforcement wall extending between the first gusset plate and the second gusset plate.

10. The shock mount assembly in claim 9 wherein,
the first gusset plate reinforcement wall comprises two rectangular wall portions, attached together at an angle and attached substantially perpendicularly to and between the first gusset plate and the second gusset plate.

11. The shock mount assembly in claim 7 further comprising,
a second gusset plate reinforcement wall extending between the first gusset plate and the elbow first portion.

12. The shock mount assembly in claim 11 wherein,
the second gusset plate reinforcement wall comprises a rectangular wall portion and a trapezoidal wall portion, attached together at an angle and attached substantially perpendicularly to and between the first gusset plate and the elbow first portion.

13. The shock mount assembly in claim 1 further comprising,
a first frame contact plate that is attached to a first surface of the mounting beam, and the first frame contact plate is attachable along and to a first surface of the transverse frame beam.

14. The shock mount assembly in claim 1 wherein,
a second frame contact plate is attached to a second surface of the mounting beam, and the second frame contact plate is attachable along and to a second surface of the transverse frame beam.

15. A shock mount relocation and frame strengthening device for a vehicle suspension system and frame, the shock mount relocation and frame strengthening device comprising:
a mounting beam having at least a first attachment plate;
a first shock mount attached to a mounting beam first end, the first shock mount comprised of at least a first gusset plate that extends from the first shock mount, the first gusset plate having a shock mount aperture;
wherein the shock mount relocation and frame strengthening device is attachable to a preexisting vehicle suspension system and frame comprised of a transverse frame beam, a first longitudinal frame beam, and a second longitudinal frame beam, the first attachment plate attachable to the transverse frame beam and the first shock mount attachable to the first longitudinal frame beam at a joint of the first longitudinal frame beam and the transverse frame beam.

16. The shock mount relocation and frame strengthening device in claim 15 further comprising,
a mounting beam second attachment plate that is attachable to the at least one transverse frame beam.

17. A shock mount assembly comprising:
a mounting beam having a mounting beam first end and a mounting beam second end;
a first frame contact plate and a second frame contact plate that each to a first and second surface of the mounting beam, respectively
a first elbow attached to the mounting beam first end;
a second elbow attached to the mounting beam second end; and
a first shock mount and a second shock mount, each shock mount comprising a shock mount first plate extending substantially horizontally from the first elbow and substantially opposite from the mounting beam, and a first gusset plate and second gusset plate, each extending from the shock mount first plate and having a shock mount apertures; wherein the shock mount assembly is attachable to a vehicle frame, the vehicle frame comprised of a first longitudinal frame beam and a second longitudinal frame beam, and the first elbow and the second elbow are attachable to the first longitudinal frame beam and the second longitudinal frame beam, respectively, and the shock mount first plates extend outside of the first and second longitudinal frame beams; and a first shock and a second shock are attachable to the first shock mount and second shock mount, respectively, the mounting beam has a width that substantially matches the width of the transverse frame beam and the first and second frame contact plates are attachable along and to a first and second surface of the transverse frame beam, respectively.

* * * * *